Oct. 8, 1963 W. H. OLDENDORF 3,106,640

RADIANT ENERGY APPARATUS FOR INVESTIGATING SELECTED AREAS OF THE INTERIOR OF OBJECTS OBSCURED BY DENSE MATERILAL

Filed Oct. 6, 1960 7 Sheets-Sheet 1

William H. Oldendorf,
INVENTOR.
BY.
Billy A. Robbins
ATTORNEY.

Oct. 8, 1963 W. H. OLDENDORF 3,106,640

RADIANT ENERGY APPARATUS FOR INVESTIGATING SELECTED AREAS OF THE INTERIOR OF OBJECTS OBSCURED BY DENSE MATERILAL

Filed Oct. 6, 1960 7 Sheets-Sheet 2

William H. Oldendorf,
*INVENTOR.*
*BY.*
Billy A. Robbins
*ATTORNEY.*

Oct. 8, 1963 W. H. OLDENDORF 3,106,640

RADIANT ENERGY APPARATUS FOR INVESTIGATING SELECTED AREAS OF THE INTERIOR OF OBJECTS OBSCURED BY DENSE MATERILAL

Filed Oct. 6, 1960 7 Sheets-Sheet 3

William H. Oldendorf,
INVENTOR.
BY.
Billy a. Robbins
ATTORNEY.

William H. Oldendorf,
INVENTOR.
BY.
Billy A. Robbins
ATTORNEY.

William H. Oldendorf,
INVENTOR.
BY.
Billy A. Robbins
ATTORNEY.

William H. Oldendorf,
INVENTOR.
BY.

Billy A. Robbins
ATTORNEY.

Oct. 8, 1963 W. H. OLDENDORF 3,106,640

RADIANT ENERGY APPARATUS FOR INVESTIGATING SELECTED AREAS OF THE INTERIOR OF OBJECTS OBSCURED BY DENSE MATERIAL

Filed Oct. 6, 1960 7 Sheets-Sheet 7

William H. Oldendorf,
*INVENTOR.*

*BY.*

Billy A. Robbins

*ATTORNEY.*

United States Patent Office 3,106,640
Patented Oct. 8, 1963

3,106,640

RADIANT ENERGY APPARATUS FOR INVESTIGATING SELECTED AREAS OF THE INTERIOR OF OBJECTS OBSCURED BY DENSE MATERIAL

William H. Oldendorf, % Veterans Administration Center, Los Angeles, Calif.

Filed Oct. 6, 1960, Ser. No. 60,905
16 Claims. (Cl. 250—52)

This invention relates generally to the investigation of objects with radiant energy and more particularly to such investigation when points of interest within an object are obscured by other areas of discontinuously radiodense matter.

Shadow roentgenographic or X-ray techniques are valuable and useful methods for examining the structure of the inaccessible interior of an object. However, the information obtainable by such methods is severely limited by superimposition of detail at different depths of the object.

The prior art attempts to overcome the above-indicated limitation due to the superimposition of details have been made by using complicated mechanical techniques such as planography, tomography, laminography, and the like which typically involve the synchronous motion, at identical angular rates, of a radiation source and a recording plate which is sensitive to the radiation. In principle, motion during the exposure period theoretically blurs everything not on a plane parallel to the plate and on the axis of rotation. This provides a sectional radiograph of a layer of the object under consideration which layer has a vague and indefinite thickness. Thus the mechanical isolation of the layer or section from other detail is quite poor. Further, such techniques are extremely cumbersome and expensive, and the presentation of details of interest is quite poor.

Accordingly it is an object of this invention to provide apparatus and method for investigating interiors of objects which are not subject to the disadvantages of the prior art.

It is another object of the present invention to provide a system which is substantially unlimited as to resolution of detail irrespective of the thickness or radiodensity of the object.

It is another object of the present invention to provide such a system which is substantially not limited as to resolution of detail irrespective of the complexity of otherwise obscuring detail.

It is another object of the present invention to provide such a system which is substantially unlimited as to detail irrespective of radiodense discontinuities within the object.

It is another object of the present invention to provide such a system which is mechanically simple and inexpensive both to operate and to manufacture.

It is another object of the present invention to provide such a system which does not require complicated photographic techniques and equipment.

Briefly these and other objects and advantages of the present invention are achieved by providing a beam of radiated energy such as gamma rays, radio X-rays, or types usually considered as corpuscular such as neutrons or electrons. The beam is collimated and has a small diameter compared to the dimensions of the detail to be observed. Relative rotary motion between the object to be observed and the beam is provided so that the beam passes through the axis of rotation. A detector of the radiated energy is disposed to detect a scattered or non-absorbed portion of the beam, subsequent to its intersection with the object, coming from the direction of that region at the intersection of the beam and the axis of rotation. As seen by the detector, this region is isolated because it is at the center of rotation while all other points in the object are rejected by virtue of their transverse motion across the beam. The angular motion makes possible the electronic isolation of this intersection.

Having thus isolated a discrete region, other regions may be successively observed by providing relative linear movement between the object and the axis of rotation and noting changes in radiodensity of the isolated discrete region. Thus a line through the object is observed; and when a plurality of such lines are taken, for example parallel to each other, the entire interior of the object may, when desired, be effectively observed.

The intersection of the beam and the axis of rotation is hereinafter referred to as the isolated or cross point and defines that point in space the radiodensity of which it is the purpose of this invention to monitor. The radiodensity of this cross point causes the radiated beam to be modulated in such a manner that the signal produced by such modulation may be electronically isolated from the signals produced by all other points in the path of the beam. Thus by rapidly rotating the object to be observed as it is passed across the beam, a systematic rejection of all points seen by the beam except one, at the center of rotation, provides a very clear picture of the radiodensity of a line through the object determined by the locus of points in the object where the beam and the center of rotation intersect.

For purposes of presenting the observations in a useful and meaningful form, the output signal of the detector, which signal is a measure of the intensity, for example, of the beam portion detected, is processed by a low pass filter. The filter eliminates or time averages any fluctuations in the beam which are at or above frequencies of the order of the rotation frequency thereby removing the modulation of the beam caused by irregularities not at the center of rotation of the beam but through which the beam passes as it rotates relative to the object. However, the low frequency modulation due to the slow linear movement of the cross point remains low enough to fall within the filter pass-band. The time averaged signal or function is then amplified and transformed, as by a moving-paper recorder or by an oscilloscope or by a varying intensity of a point source of light, to one having a spatial dependency whereby a visual indication of the radiopacity of the object is presented. Alternatively a sonic display may be presented where, for example, the pitch or intensity of a tone informs the observer of the radiopacity characteristics of the object being investigated.

The novel features of this invention, as well as the invention itself, both as to its organization and method of operation, will be best understood from the following description, taken in conjunction with the accompanying drawings, in which like reference numerals refer to like parts, and in which.

Figures 3, 3A, 3B, 3C:
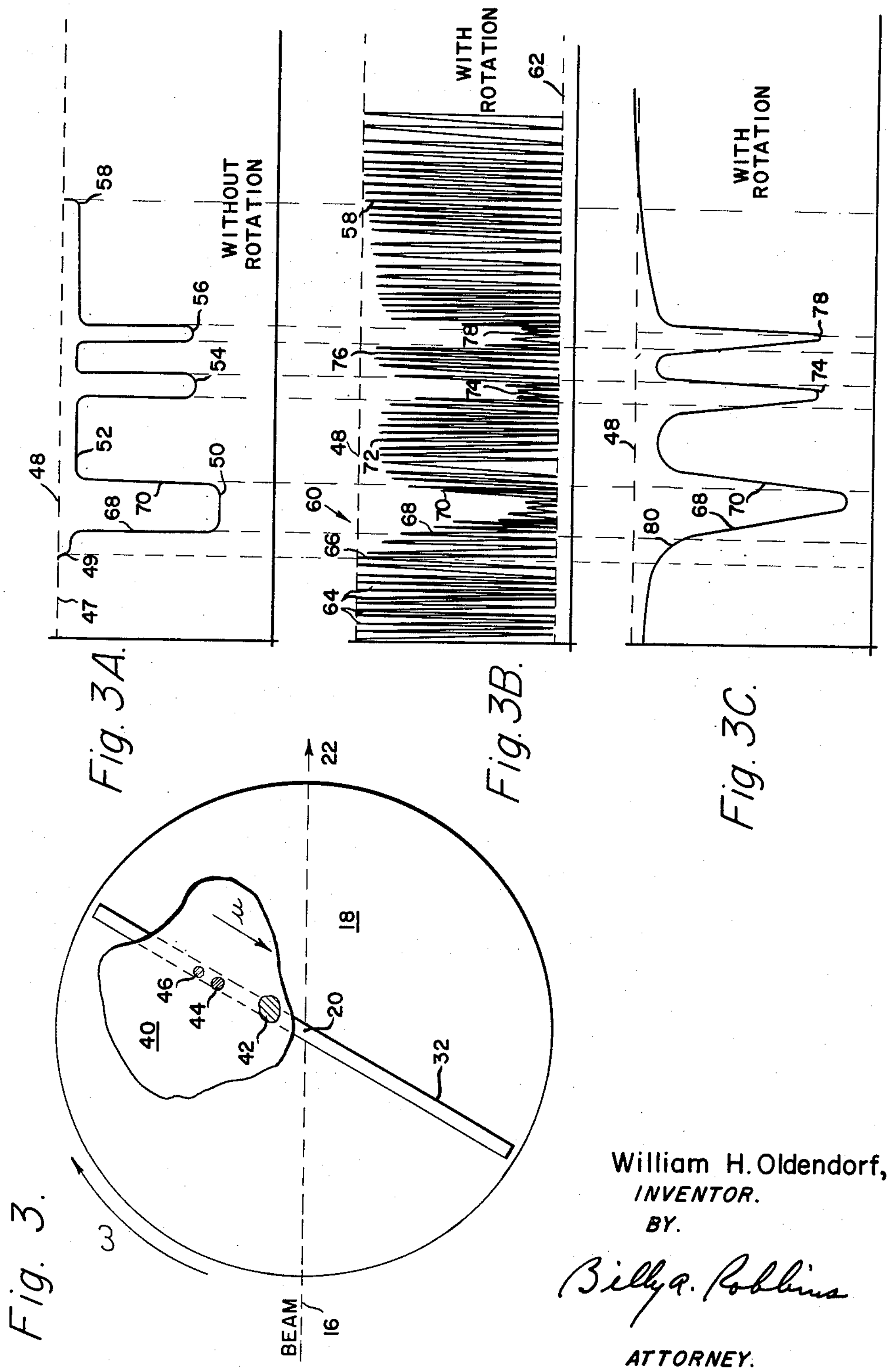
FIG. 3 is a schematic view of a portion of the apparatus of one form of the invention for illustrating the principles of operation of the invention.
Figure 4A:
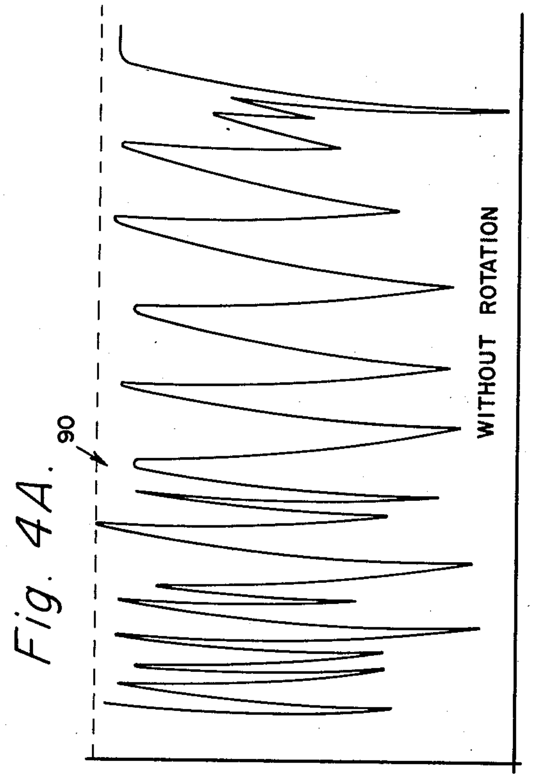
Figure 4B:
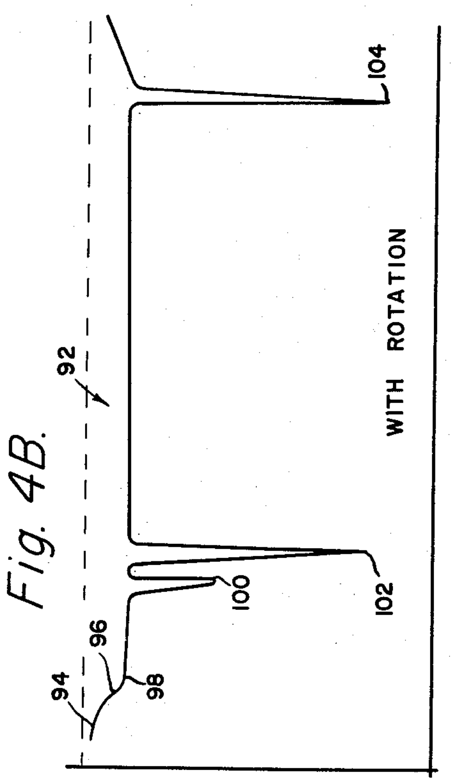
Figure 4:
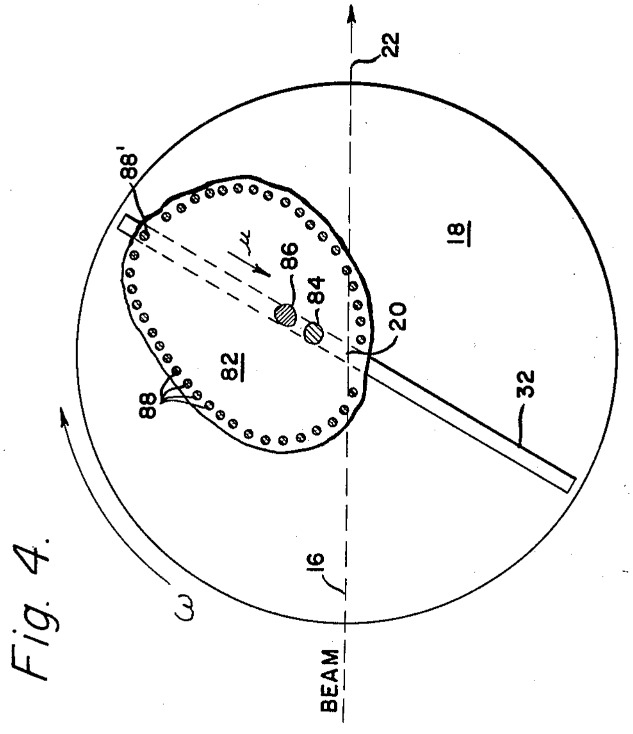
Figures 5, 5A, 5B:
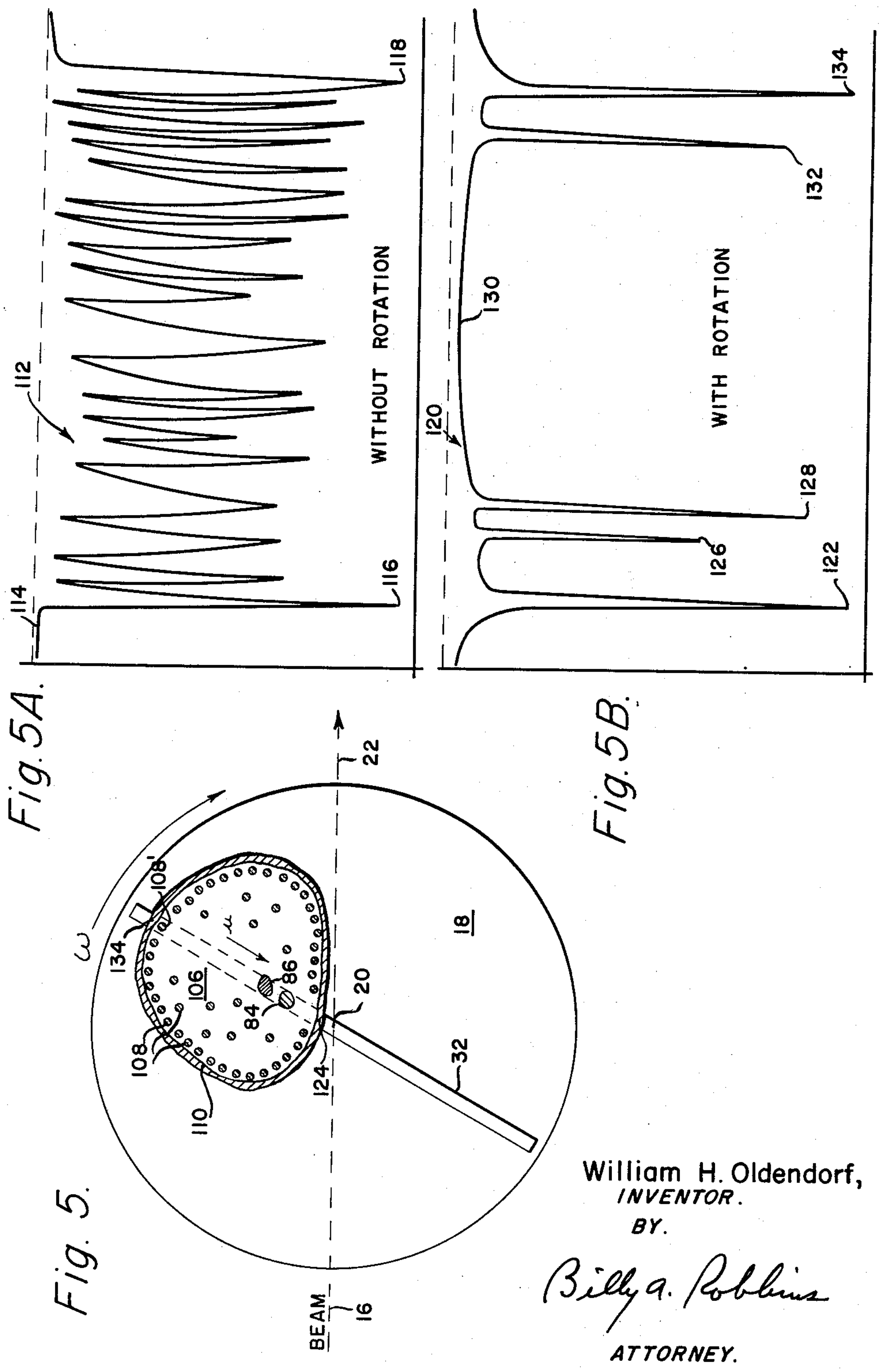
Figure 6:
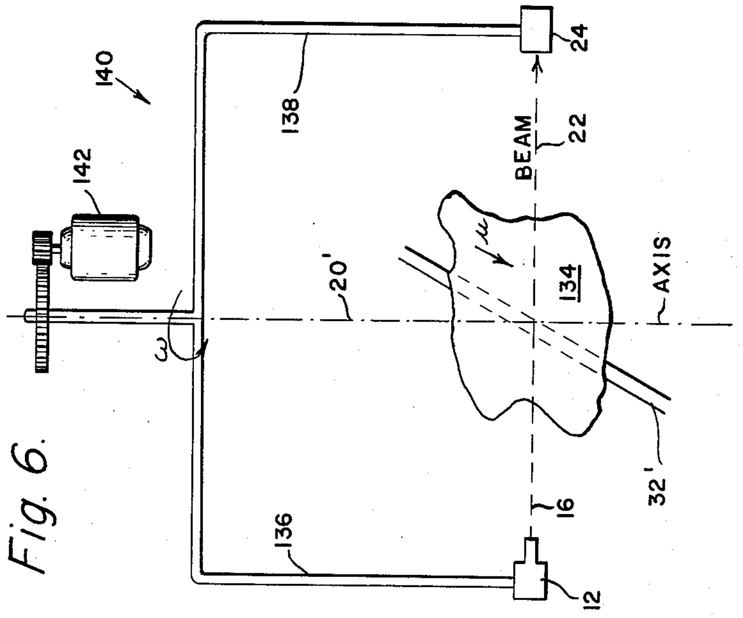
Figure 7:
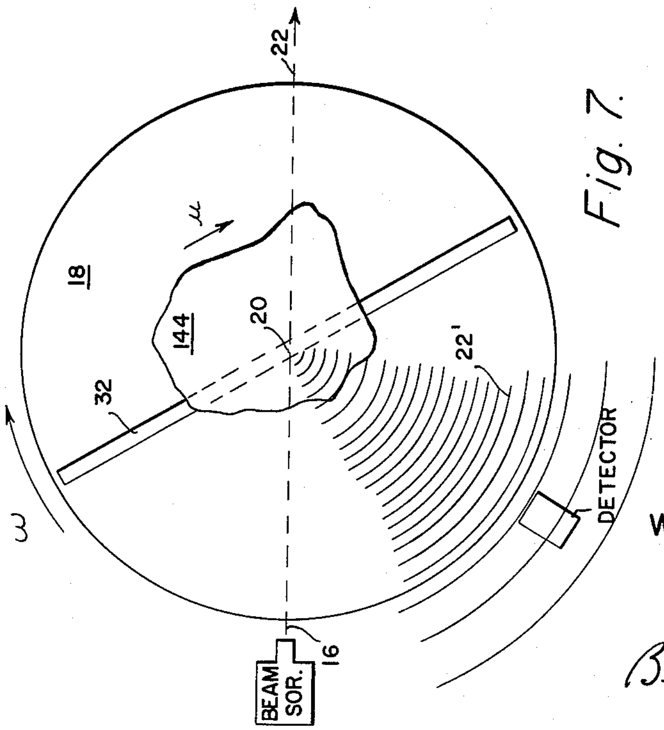
Figure 9:
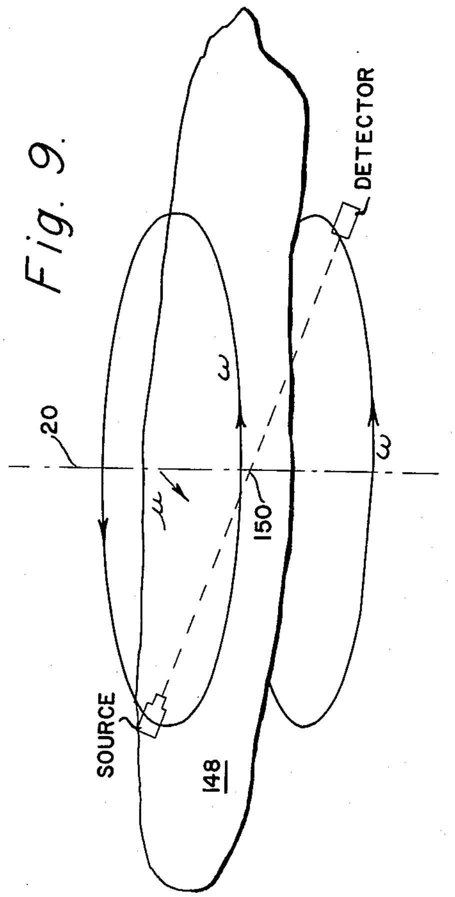
Figure 8:
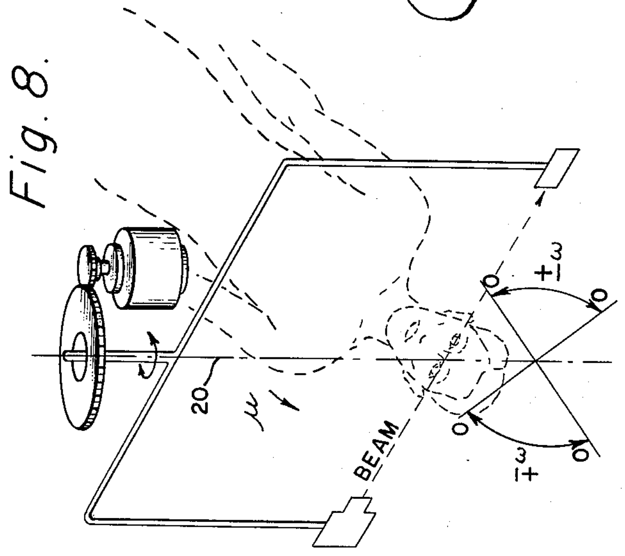
Figure 10:
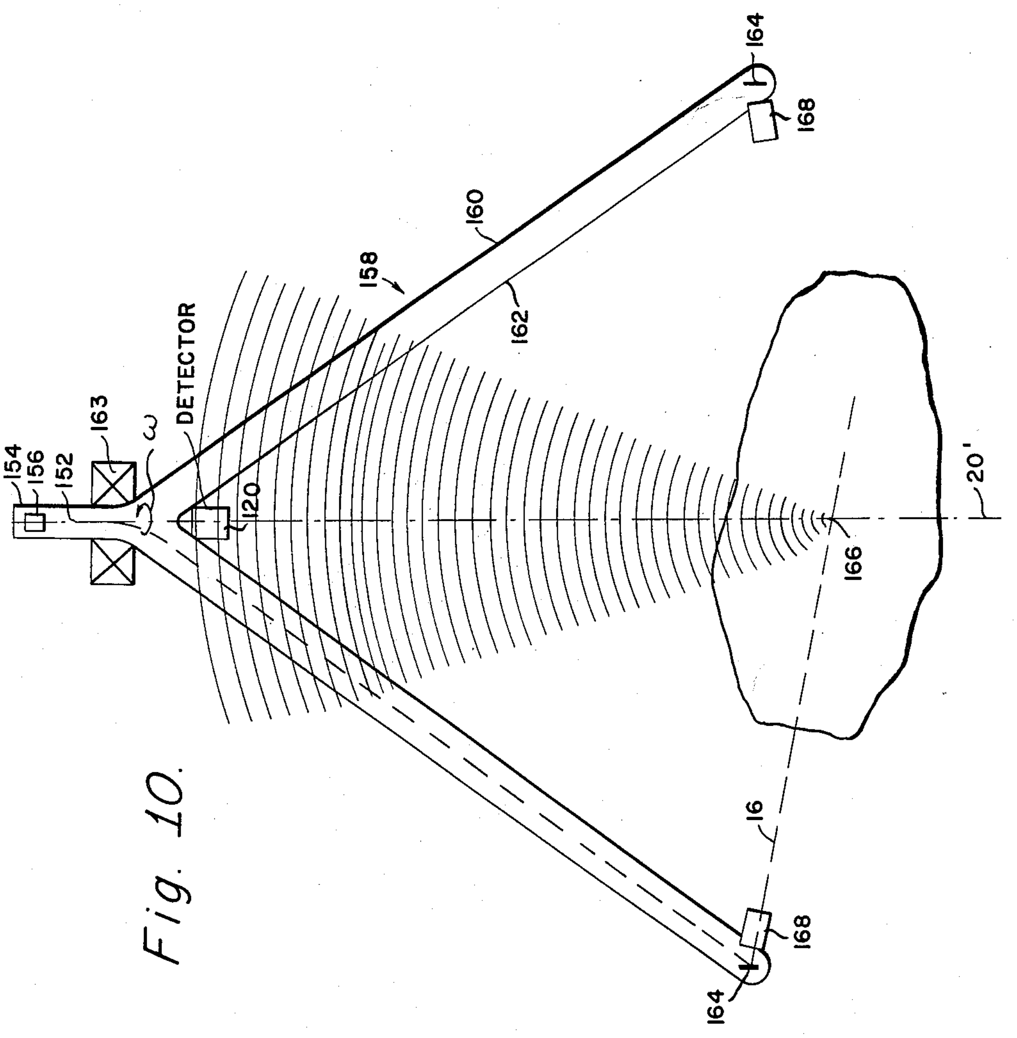

FIG. 3A, FIG. 3B, and FIG. 3C are recorder graphs associated with the device of FIG. 3 and each plots radiodensity on the ordinate as a function of time and displacement along a line through an object to be observed;

FIG. 4 is a view similar to FIG. 3 in which the object is shown as containing dense shielding matter discontinuously distributed within the object near its periphery;

FIGS. 4A and 4B are similar to FIGS. 3A and 3C, respectively;

FIGS. 5, 5A and 5B are similar to FIGS. 4, 4A and 4B, respectively;

FIG. 6 is a schematic view of a form of the invention in which the object is held stationary and the beam apparatus rotates;

FIG. 7 is a view of a form of the invention in accordance with which the scattered or reflected beam is detected;

FIG. 8 is a view of a form of the invention in which the beam is rotated back and forth in opposite senses of rotatioin about an axis through the object;

FIG. 9 is a schematic view of a form of the invention in which the beam rotation with respect to the object describes a cone with its apex within the object; and FIG. 10 is a schematic view of a form of the invention utilizing an electronically rotated X-ray beam.

Referring more specifically to the individual figures, they have each been deliberately made as schematic as possible in the cause of presenting a description of the invention which may be most readily understood. In this connection, for example, many mechanical details of support or motivation and, similarly, electronic details which are obvious to those skilled in the arts involved have been deleted from the drawings in order to show more clearly the actual invention and its principles of operation.

Figures 1, 2:
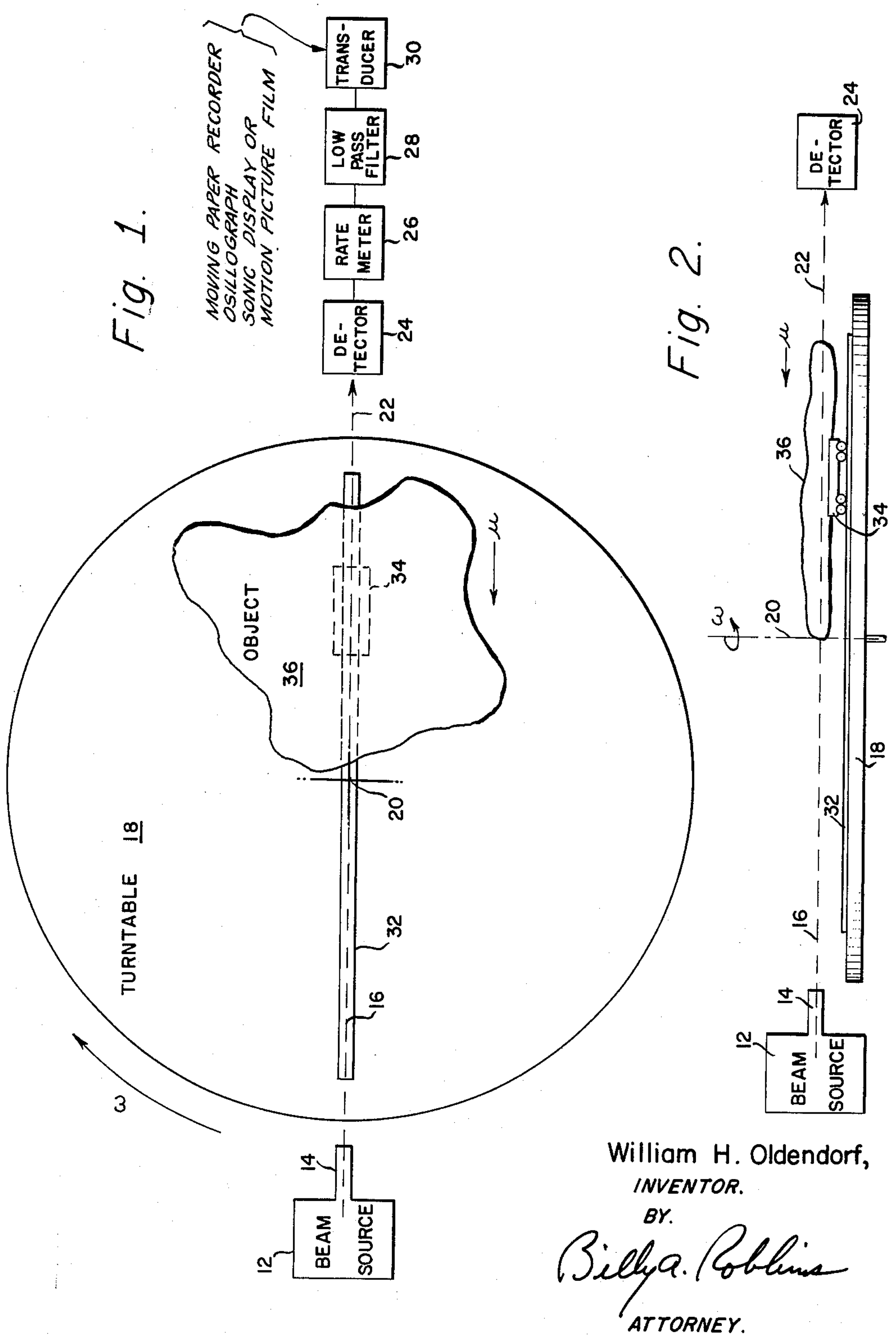
FIG. 1 is a plan, schematic view of the apparatus in an embodiment capable of carrying out the method of the present invention and illustrative of the system of the present invention.
FIG. 2 is a side view of a portion of the apparatus of FIG. 1.

In FIG. 1 there is illustrated schematically a source 12 of electromagnetic radiation which may, for example, be gamma rays, X-rays or charged particles such as electrons. The radiation from the source 12 is collimated by a collimator 14 into a small diameter, parallel beam 16. The beam 16 is caused to traverse a turntable 18 and pass orthogonally through its axis 20 of rotation. A portion 22 of the beam 16 is impressed upon a detector 24 subsequent to any interaction the beam 16 may have experienced in its traversal from the source 12 across the turntable 18. The detector 24 may be of any appropriate type for determining the intensity or energy of the beam portion 22. For example, the detector 24 may be a scintillation detector, photo-electric cell, and electron multiplier combination for providing electrical output signals representative of the particles of the beam portion 22.

The output signals of the detector 22 are applied to a rate meter 26 which in a conventional manner integrates the counting signals into an analog signal representative of the number of particles per unit of time which are contained in the beam portion 22. The output signal of the rate meter 26 is impressed upon an amplifier and low pass filter 28 which eliminates or averages out fluctuations in the rate meter signal which have a frequency comparable to or higher than the frequency of rotation of the turntable 18. In some applications the integrating network of the rate meter may, in itself, constitute a suitable low pass filter. The output signal of the filter 28 is recorded or displayed, or otherwise indicated, by a transducer 30 which may be of the type, for example, which plots the amplitude of an electrical signal as a function of time on a moving sheet of recording material. The transducer 30 may also, or alternatively, include a cathode ray display device or an earphone. Additionally the display may be in the form of a point light source, the intensity of which is modulated and directed upon film to create a two dimensional graphic display.

As indicated above, the turntable 18 is caused to rotate, in this example, at a constant angular velocity ($\omega$) where $\omega=2\pi f$ about the axis 20 through which the beam 16 always passes without impinging on the turntable or its mechanical components. Mounted on the turntable 18 is a carriage track 32 along which a carriage 34 is caused to move slowly by, for example, self-propulsion by means of a battery operated electric motor mounted on the carriage. Alternatively, the carriage may be pulled across the turntable by a spring-driven motor operated cable with the motor mounted on the turntable.

For reasons which will be made clear below, the velocity of the carriage 34 across the turntable 18 is very slow compared to the angular velocity of the turntable. "Slow" is defined throughout the specification and claims as meaning that at least one revolution occurs during the time that a point at rest with respect to the carriage is moved a distance equal to the diameter of the beam 16.

An object 36 which may, for purposes of description and example only, be visually opaque and which is to be radio-investigated is rigidly mounted on the carriage 34 so that in operation, as described below in connection with subsequent figures, the object 36 is rotated about the axis 20 by virtue of its disposition on the turntable 18 while being carried slowly across the axis 20 by virtue of the velocity of the carriage 34 across the surface of the turntable 18 along the track 32. FIG. 2 is a side view of a portion of the structure of FIG. 1 and illustrates that the beam 16 is not intercepted by the turntable or the carriage.

In a typical demonstration of the principles of this invention the source comprised a 10 millicurie amount of iodine 131 ($I^{131}$) surrounded by lead but having a collimator opening therein 1.6 millimeters in diameter by 5 centimeters in length. This provided a gamma beam of approximately 60,000 counts per minute through 40 centimeters of air. The turntable was a 16 r.p.m., Alliance model JPQ8 by Allied Electronics. The carriage was pulled along the track by a motor mounted on the turntable at a velocity $\mu=80$ millimeters per hour. The detector probe combination was a sodium iodide scintillation crystal and photomultiplier tube model ASD–1 manufactured by C. W. Reed Company of Los Angeles. The rate meter was model RM–2 manufactured by C. W. Reed Co. The recorder was a Texas Instruments Co. Model WS Servo Writer having a paper speed of 6 inches per hour. The time constant of the rate meter-recorder combination was 30 seconds. The beam was of the order of 2 millimeters in diameter.

Referring to FIG. 3, apparatus similar to a portion of that of FIG. 1 and FIG. 2 is illustrated. For example, a small diameter beam 16 is projected across a turntable 18 and passes through the axis 20 thereof. The beam emerges as a portion 22, up to 100%, of the original beam 16 depending upon what interaction, for example absorption or scattering, if any it has suffered in traversing the turntable. Again, the turntable is rotated at an angular velocity $\omega$; and, for example, an opaque object 40 is mounted on a carriage which carries it slowly across the turntable face on a track 32 while the turntable rotates relatively rapidly.

In this example, the opaque object 40 has a discontinuous radiodensity in its composition. The discontinuity is illustrated by three regions 42, 44, 46 of significantly denser, more absorptive, matter in the otherwise homogeneously opaque object. It is to be noted that as the opaque object 40 moves across the turntable along the track 32 the region 42 passes through the axis 20 of rotation. Then the region 44 followed by the region 46 will pass across the axis 20.

It will now be shown that a graph may be readily made of the radiopacity of the opaque object 40 along a line therethrough scribed by the intersection of the beam 16 and the axis 20 as the opaque object 40 is moved along the track 32. Consider first the case of the opaque object 40 being drawn across the turntable with no rotation thereof. The graph 47 of FIG. 3A plots intensity of beam portion 22 as a function of time on the abscissa. The time scale here as in subsequent figures is such that there is a one to one correlation between the length of abscissa shown and the traversal of the opaque object 40 once across the turntable from one side to the other.

Such a curve is typical of that which may be presented visually by a recorder or transducer 30 as shown in FIG. 1.

As the opaque object 40 is drawn along the track 32 through the beam 16, there is no interaction or absorption and the intensity of the beam remains at a maximum level 48 until a portion of the object 40 intercepts the beam. This point 49 of time shows as a small step on graph 47 indicating that the opaque object 40 has a relatively low radiodensity. As the beam impinges upon the denser region 42, however, the beam is heavily absorbed, see point 50, in proportion to the density and length of the region 42 along the beam. At point 52 on the curve 47 the beam sees only the low density material and the absorption is much less. The absorption remains greater than at point 49, however, because the beam traverses a longer path within the object 40. Point 54 of curve 47 represents the radiopacity of the region 44. Assuming that the regions 42, 44 and 46 are of equal radiodensity, the point 54 is not as deep as point 50 because the region 44 has a shorter dimension parallel to the beam. Further, the point 54 is not as wide in time on the curve 47 as is the point 50 because the region 44 has a smaller dimension perpendicular to the beam and therefore less time is required for the region 44 to traverse the beam. Similarly to the point 54, the point 56 represents the radiopacity of the region 46. After the point 56 there is less and less beam absorption and finally at point 58, the beam no longer is intercepted by the object 40.

Thus, the above simple case illustrates that a representative radiant energy graph is obtainable without rotation. However, this is because the regions 42, 44 and 46 are never shielded by each other or by other discontinuously dense matter.

Although rotation is not necessary to graph this simple case, the invention is best understood by carrying the example further and applying rotation to the turntable 18 while the opaque object 40 is pulled slowly across its center to the opposite side. The graph 60 of FIG. 3B illustrates the instantaneous intensity of the beam portion 22. As the opaque object 40 is rotated through the beam twice each revolution, the regions 42, 44 and 46 fortuitously line up to severely absorb the beam so that only a minimum amount of the beam 16 remains in the portion 22. This minimum intensity is represented on FIG. 3B as a level 62 across the graph. The minute dips 64 occur twice each revolution and extend to the level 62.

Again level 48 represents the beam uninterrupted. As the turntable 18 is rotated and the opaque object 40 is not over the axis 20, there is a time twice during each revolution when the beam is uninterrupted. These times become shorter and shorter as the object 40 approaches the axis 20 so that the average density slowly decreases as the object 40 spends more and more time per revolution in the path of the beam. At point 66, corresponding to the point 49 of FIG. 3A, the beam is continually interrupted to some degree because the axis 20 (and therefore the beam 16) at that and subsequent points passes through the material of the object 40. As the region 42 approaches the axis 20, it obviously spends a larger and larger proportion of the period of each revolution interrupting and absorbing the beam until the axis 20 passes through the region 42 at the point 68; and the beam is continuously interrupted by the region 42 until it has crossed beyond the axis at point 70 on graph 60. Points 68 and 70 are shown in FIG. 3A also.

At point 72 the intensity of uninterrupted beam portion is again relatively high twice each revolution because the beam 16 spends only a small portion of each revolution passing through the denser regions. At point 74 the dense region 44 is over the axis of revolution and consequently absorbs the beam continuously until the region is translated through the axis. Point 76 represents the relatively low absorption when the axis 20 is between the dense regions 44 and 46. Point 78 represents the high rate of absorption when the beam is continuously interrupted by the dense region 46.

FIG. 3C represents the output signal of the filter-amplifier 28 (see FIG. 1) which has time averaged the rapidly fluctuating signal illustrated by the graph of FIG. 3B. The graph 80 is a typical presentation of a moving sheet recorder of the type described below.

Thus, it is clear that in this simple example a graph may be provided by rotating the visually opaque object about an axis which is translated laterally through the object while looking continuously at the axis with a penetrating beam of radiation. In other words, a unique and discrete region in the opaque object defined by the intersection of the beam and the axis of rotation may be isolated and observed while all other portions of the object are rejected by virtue of their transverse motion across the line of sight.

Referring to FIG. 4 a more realistic example is shown in order to demonstrate more fully the invention and its advantages. Again a beam 16 is projected across the axis 20 of revolution of a turntable revolving at an angular velocity $\omega=2\pi F$ and having a track 32 thereon along which an opaque object 82 is carried slowly at a linear velocity $\mu$ across axis 20. A beam portion 22 emerges after interaction with the object 82. In this example the opaque object 82 is substantially homogeneous in its composition except for objects of interest in its interior which are represented respectively by region 84 of moderate radiodensity, region 86 of high radiodensity, and a series of high density shielding regions 88. Note that one of these designated 88', and regions 84 and 86 are in line and will pass over the axis 20 as the object 82 traverses the track 32 from one side of the turntable 18 to the other.

FIG. 4A, similarly to FIG. 3A, presents a graph of the density of object 82 when it is passed without rotation across the beam 16. Again the length of the abscissa in time is one pass of the carriage along the track 32, or the effective length of the track divided by $\mu$. An intensity curve 90 represents the magnitude along the ordinate of the emergent beam portion 22.

The confusion of the curve illustrates emphatically that the objects of interest, regions 84 and 86, are totally obscured by regions 88.

Referring to FIG. 4B, a plot similar to that of FIG. 3C is made by rotating the turntable 18 at $\omega$ while the object 82 is translated slowly across the surface thereof. An intensity versus time curve 92 results which clearly presents the radiodensity and position of the object 82 along a line through its interior determined in the figure by the regions 84, 86, 88'. A graph similar to that of FIG. 3B is omitted as unnecessary to the demonstration. A portion 94 of the curve illustrates that the beam is only intermittently interrupted by the object 82 while at a point 96 the edge of the object 82 passes over the axis 20 and begins to continuously absorb a portion of the beam 16. At point 98 an absorption level is reached which represents substantially the average absorption of all denser regions of the object 82. In the figure a dense region 88 is deliberately omitted from passing over axis 20 at the beginning of curve 22, and region 88' is inserted to pass directly over axis 20, at the end of curve 92, in order to preclude any fortuitous symmetry in the curve from misleading the reader and thereby preventing him from obtaining a prompt understanding of the operation of the invention.

Point 100 of curve 92 represents the intensity of beam portion 22 when the moderately dense region 84 is passing through axis 20 and is continuously within the beam 16. Again the time width of the "spike" in the curve 92 at point 100 represents the length of the region 84 in the direction along the track 32, and its depth represents its average diameter and density. Similarly the point 102 represents radiodensity characteristics of the region 86. The beam suffers heavier absorption at point 102 than at point 100 because, as given above, the region 102 is a highly radiodense region.

As the axis 20 is translated from the region 86 to the region 88', the curve 92 continues to represent substantially the average radiodensity of the object 82 because all the dense regions are rejected due to their transverse motion across the beam. At point 104 the radiodensity of the highly dense shielding region 88' is presented because it is caused to pass over the axis 20.

Thus by rapidly rotating the object 82 as it is passed across the beam, a systematic rejection of all points seen by the beam except one, at the center of rotation, provides a very clear picture of the radiodensity of a line through the object determined by the locus of points in the object where the beam 16 and the axis 20 intersect.

Referring to FIG. 5, the apparatus shown is similar to that of the previous figures except that the object is replaced by an even more complicated object 106 which contains the same points of interest regions 84, 86, as did object 82 of FIG. 4. In addition, however, highly dense shielding regions 108 are placed randomly throughout the object as well as around its periphery; and an extremely dense shield 110 is wrapped completely around the object 106 to further shield the regions 84, 86, of interest.

The curve 112 of FIG. 5A is similar to curve 90 of FIG. 4A in that it represents the intensity of the emergent beam portion 22 as the object 106 is moved across the turntable 18 without rotation. At point 114 the beam is uninterrupted, while at point 116 the beam is passing obliquely through a shield 110 and is suffering maximum absorption. After point 116 the curve 112 is confused and useless except to show shield 110 again at point 118.

In contrast, the curve 120 of FIG. 5B, similarly to that of FIG. 4B, taken with the turntable rotating, presents a clear picture of the radiodensity of regions 84, 86, 108' in spite of the other shielding regions 108 and the shield 110. Point 122 represents the density of the shield 110 taken as axis 20 is translated through the region 124 thereof. Point 126 represents the radiodensity characteristics of the moderately dense region 84 while point 128 displays those of the highly dense region 86. The portion 130 of curve 120 "bows" upwardly indicating that the beam in that period of time is passing through a minimum thickness of shield 110 and at the highest point of the "bow" the beam is passing through only two actual thicknesses of shield 110 instead of passing obliquely through its walls. Point 132 represents the density characteristics of region 108' which region was caused to pass through the axis 20 at the time indicated by point 132. Point 134 displays the density of the shield 110 at the region 134 thereof as that region passes through axis 20.

Referring to FIG. 6, a form of the invention is schematically illustrated in which an object 134 is disposed without means for rotating it. However, the beam 16–22 does rotate with respect to object 134 by virtue of the source 12 and the detector 24 being supported on arms 136, 138, respectively of a rigid structure 140 which rotates about an axis 20'. Arms 136, 138 are disposed on opposite sides of the object 134 and are aligned so that the beam passes through axis 20' and so that the emergent portion 22 enters the detector 24. A motor 142 drives structure 140 at an angular velocity $\omega$. A lineal motivation means provides translation of the object 134 along track 32' so that axis 20' passes through the object 134 along a predetermined line of interest. Alternatively, object 134 may obviously be completely at rest and structure 140 laterally translated.

A resulting graph developed from the output signal of the detector 24 would in principle be exactly like those discussed previously.

FIG. 7 illustrates another form of the invention in which all the previous principles apply except that the emergent beam 22' is radiant energy reradiated from radiodensity discontinuities in the object as by scattering or reflection. In this embodiment, the beam 16 impinges upon, or illuminates the matter along its length particularly that material at the axis 20. The detector always looks at the axis and thereby detects the radiation coming specifically from that direction. Again graphs developed from the output signals of the detector when the turntable is rotated and the object translated thereacross display the pattern of the radiodensity of a line through the object, even though such graphs are based upon scattered energy instead of absorbed energy.

FIG. 8 illustrates a system of the invention in which 360° continuous rotation of the beam with respect to the object is not utilized. Thus an object which may not readily be encompassed on all sides by the rotating arms of the system of FIG. 6 may nevertheless be readily graphed in accordance with the principles of the invention. This stems from the advantage of the invention that the rotation velocity is not critical; it may even be zero for short periods of time so long as it remains on a relatively short term time average, but fast with respect to the lineal translation velocity of the axis through the opaque object. In this example, the beam rotationally oscillates back and forth about axis 20. The oscillation may vary at the rate $r$ in angular velocity between $\omega$ and $-\omega$ and passing through 0 twice each cycle. In this case the component of frequency $r$ is removed by a low pass filter such as that designated by the reference numeral 30 in FIG. 1. Again the axis 20 is translated laterally at a lineal velocity $\mu$; and the resulting graphs developed as described above are in principle exactly like those discussed in detail in connection with previous figures.

In FIG. 9 there is illustrated a form of the invention in which the object 148 is scanned by a rotating beam which does not rotate in a plane but rather in a conical surface, the apex 150 of which lies on the axis 20. Again the source and detector are aligned and rotate at the angular velocity $\omega$ in parallel planes above and below the object 148. Also axis 20 is laterally translated at a velocity $\mu$ preferably so that apex 150 remains in a plane perpendicular to axis 20. The detector might also be positioned on the same side of the object as the source and monitor scattered radiation as in FIG. 7.

FIG. 10 illustrates an X-ray example of the invention in which no mechanical rotation is necessary. The investigative apparatus is a figure of revolution symmetric about axis 20'. The figure is a cross sectional view taken in a plane containing axis 20'. An electron tube 152 is provided which includes a neck portion 154 for housing an electron gun 156 and an expanded portion 158 determined by two concentric conical walls 160 and 162 which may have equal angles of divergence. Electron gun 156 projects a beam of electrons, which may have, for example, energies of approximately 30,000 volts. The stream is deflected and rotated by a deflection means 163 so that it strikes a circular X-ray target 164 at a point which travels along the target at an angular velocity $\omega$. The surface of the target 164 is disposed so that the X-ray beam is predominantly directed toward an apex 166 on axis 20'. Collimator windows 168 are disposed as shown to permit the X-rays to pass out of the tube wall 162, which may be of metal, and to further collimate the X-ray beam toward the apex 166. A stationary detector 170 is aligned to look at the region defined by the rotating beam and the axis 20' at the apex 166. Again the emergent beam 22' is a scattered, or reflected, beam and resulting graphs are in principle exactly like those discussed above.

In the description and discussion presented above in connection with FIGS. 1 through 10, the graphs are considered as graphs of radiodensity along a line only. Obviously more complete graphs may be developed by taking successively such lines parallel to each other or in any other pattern. Then to investigate in a third dimension, the beam may be raised or lowered in steps to develop parallel, investigated planes.

In the foregoing description the lines through an object have been taken parallel to the beam of radiation. While such is preferred, it should be expressly understood that the line may be taken at any angle, for example perpendicular to the beam, so long as the axis of relative rotation of the object and the beam intersect.

The figures and the models chosen therein have often suggested medical investigation such as intracranial graphing. However it is stressed that the scope of the invention includes the investigation by radiant energy of any object such as manufactured articles, archeological relics, et cetera.

The scope of the invention is to be limited only by the following claims.

I claim:

1. A system for displaying the radiodensity characteristics of an opaque object comprising: a source of radiant energy of the character to penetrate into said object; collimation means for forming said radiant energy into a collimated beam having cross-sectional dimensions which are small compared to the detail of said radiodensity characteristics; means for projecting said beam along a lineal path; means for rotating said path with respect to said object about an axis thereby to define a discrete region having dimensions determined by said cross-sectional dimensions of said beam; detector means for measuring characteristics of and generating a time dependent function representative of said characteristics in said discrete region; translation means for shifting said axis, parallel to itself, and thereby said discrete region at a rate of displacement small with respect to the angular velocity of said means for rotating; and means for transforming said time dependent function into a display function of appropriate dependency for presenting said time dependent function in a predetermined mode of display.

2. A system for making a graphic reproduction of an object comprising: a radiation source for providing a collimated beam of the character to penetrate into said object and having cross-sectional dimensions which are small compared to the detail of said object; means for projecting said beam along a lineal path which includes a portion of said object; means for rotating said object with respect to said path about an axis perpendicular to and intersecting said path thereby to define a discrete region associated with said object and having dimensions corresponding in magnitude to said cross-sectional dimensions of said beam; detector means for measuring characteristics of and generating a time dependent electrical function representative of portions of said beam characteristic of the radiodensity of said object in said discrete region; translation means for laterally shifting said axis and region along said object at a rate of displacement which is slow with respect to the angular movement of said means for rotating; means for transforming said time dependent electrical function into a spatially dependent function; and presentation means for visually displaying said spatially dependent function.

3. A system for observing the radiodensity characteristics of an object comprising: a turntable rotating at angular velocity $\omega$ about an axis; a carriage track mounted on said turntable and intersecting said axis; a beam source; a beam collimator for collimating and directing a small diameter beam across said turntable through said axis thus defining a small diameter discrete region; carriage means for carrying said object along said track at a velocity $\mu$, where $\mu$ is small compared to $\omega$ such that at least one revolution of said turntable occurs while said carriage moves along said track a distance equal to the diameter of said beam; and detector means aligned toward said axis and said discrete region for detecting a portion of said beam characteristic of the radiodensity of said discrete region.

4. A system for observing the radiodensity characteristics of an object comprising: a turntable rotating at angular velocity $\omega$ about an axis; a carriage track mounted on said turntable and intersecting said axis; a beam source; a beam collimator for collimating and directing a small diameter beam across said turntable through said axis thus defining a small diameter discrete region; carriage means for carrying said object along said track at a velocity $\mu$, where $\mu$ is small compared to $\omega$ such that at least one revolution of said turntable occurs while said carriage moves along said track a distance equal to the diameter of said beam; detector means aligned toward said axis and said discrete region for detecting a portion of said beam characteristic of the radiodensity of said discrete region; said detector means being of the character to provide electrical signals representative of the instantaneous intensity of said portion of said beam; a rate meter coupled to said detector means and of the character to provide an analog output signal; a low pass filter for time averaging said analog output signal to substantially eliminate fluctuations therein of angular frequency substantially equal to $\omega$; and transducer means coupled to said filter for displaying the output signal thereof.

5. The invention according to claim 4 in which said transducer means includes a moving paper recorder.

6. The invention according to claim 4, in which said transducer means includes an oscillograph.

7. The invention according to claim 4 in which said transducer means includes a sonic display.

8. The invention according to claim 4 in which said transducer means includes a film upon which a modulated point source of light is directed.

9. A system for observing the radiodensity characteristics of an object comprising: a source of radiant energy of the character to penetrate said object; projection means for collimating a portion of said energy into a parallel beam having a diameter which is small relative to the dimensions of said radiodensity characteristics and for projecting said beam along a lineal path transversely to an axis; a detector for intercepting a portion of said beam and disposed along said path; support means for rigidly maintaining the positions of said source and projection means and said detector at rest with respect to each other; means for rotating said support means about said axis thereby defining a discrete region at the intersection of said beam and said axis having dimensions substantially equal to said diameter of said beam; and means for laterally translating said axis through said object at a velocity such that at least one revolution of said support means occurs while said axis is translated a distance equal to said diameter.

10. A device for observing the radiodensity characteristics of an object comprising radiant energy source means for generating and projecting a collimated, small diameter beam through said object along a predetermined path transversely through an axis; means for rotating said beam about said axis with respect to said object thereby defining by the intersection of said beam and said axis a discrete isolated region which is continuously illuminated by said beam; a detector aligned toward said region for detecting a portion of said beam scattered from said region; and translating means for laterally shifting said axis slowly along a direction through said object.

11. A system for visually presenting radiodensity characteristics of an object comprising: a source of radiant energy; a collimator for aligning a portion of said radiant energy into a parallel beam along a predetermined lineal path and having a small diameter compared to the dimensions of the detail of said radiodensity characteristics, said path transversely intersecting an axis; means for relatively rotating said beam at a frequency F about said axis thereby defining a discrete region at said axis which is illuminated by said beam and which has dimensions determined substantially by said diameter of said beam; a detector aligned toward said discrete region and being of the character to provide an electrical output signal representative of the intensity of a portion of said beam scattered from said discrete region; filter means for providing a second output signal and being coupled to said detector and having an effective time constant for eliminating, from said output signal, fluctuations having a frequency approximately equal to F; translation means for laterally moving said object across said axis so that said discrete region is translated at a velocity $\mu$ along a predetermined line through said object, whereby said second output signal is representative of the intensity of said portion of said beam as a function of time correlated with the translation of said discrete region along said predetermined line; and display means for transforming said function of time into a spatially dependent function and for visually presenting said spatially dependent function.

12. Apparatus for visually presenting radiodensity characteristics of an object comprising: a source of radiant energy and a collimator for projecting a portion of said radiant energy into a parallel beam along a predetermined lineal path and having a small diameter compared to the dimensions of the detail of said radiodensity characteristics, said path intersecting an axis; support means for said source and collimator, means for rotationally oscillating said support means about said axis through a predetermined angle of rotation at a frequency F whereby a discrete region on said axis is effectively continuously radiated by said beam; a detector aligned toward said region for detecting a portion of said beam, which portion being representative of radiodensity charactistics of matter in said region; means for translating said region along a line through said object at a velocity such that at least one cycle of said frequency F occurs as said region is translated across its dimension in the direction of said line.

13. The invention according to claim 12 in which said axis is perpendicular to said beam.

14. The invention according to claim 12 in which said axis is not perpendicular to said beam.

15. An X-ray system for investigating radiodensity characteristics of interior portions of an object comprising: a substantially circular X-ray target disposed perpendicularly to and substantially symmetrically about an axis; an electron gun for generating an electron stream initially along said axis at a constant axial distance thereon from said target; stream deflection means for deflecting said stream from said axis to said target and for circularly sweeping said stream at an angular frequency F whereby said stream successively impinges upon different points along said circular target, said target being disposed to direct a rotating beam of X-ray energy toward a predetermined discrete region on said axis whereby said discrete region is substantially continuously illuminated by said rotating beam; and an X-ray detector director toward said discrete region for detecting a portion of said beam emanating from said discrete region; and means for translating said discrete region through said object along a direction and at a velocity such that at least one revolution of said rotating beam occurs during the translation of said discrete region across its dimension in said direction.

16. An X-ray system for investigating radiodensity characteristics of interior portions of an object comprising: a susbtantially circular X-ray target disposed perpendicularly to and symmetrically about a predetermined axis; an electron gun axially separated from said target for generating an electron stream directed initially along said axis toward said target; stream deflection means for rotating said stream at a frequency about said axis whereby said stream impinges upon successive portions of said target along its circular length, said target being disposed to direct a beam of X-rays rotating about said axis toward a discrete region on said axis; collimator means disposed between said circular target and said discrete region for focussing said beam into a diameter which is small with respect to the detail of said radiodensity characteristics of said object, whereby said discrete region is effectively substantially continuously illuminated by the small diameter beam; a detector directed toward said discrete region for detecting a portion of said beam scattered from said discrete region; and means for translating said discrete region through said visually opaque object at a velocity which is slow with respect to F such that at least several revolutions of said stream occur while said discrete region is translated a distance equal to said diameter of said beam.

References Cited in the file of this patent

UNITED STATES PATENTS

| | | |
|---|---|---|
| 1,985,715 | Bucky | Dec. 25, 1934 |
| 2,196,618 | Watson | Apr. 9, 1940 |
| 2,798,958 | Hudson et al. | July 9, 1957 |
| 2,843,748 | Jacobs | July 15, 1958 |
| 2,907,883 | Jacobs et al. | Oct. 6, 1959 |